US012662196B2

(12) United States Patent
Benson et al.

(10) Patent No.: US 12,662,196 B2
(45) Date of Patent: Jun. 23, 2026

(54) APPARATUS, SYSTEM, AND METHOD FOR TIRE CATCHERS FOR FRAME BASED VEHICLE

(71) Applicant: Toyota Motor Engineering & Manufacturing North America, Inc., Plano, TX (US)

(72) Inventors: Blaine C. Benson, Ann Arbor, MI (US); Erin L. Twombly, Ypsilanti, MI (US); Mark C. Kulik, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 265 days.

(21) Appl. No.: 18/225,533

(22) Filed: Jul. 24, 2023

(65) Prior Publication Data

US 2025/0033707 A1 Jan. 30, 2025

(51) Int. Cl.
*B62D 25/18* (2006.01)
*B62D 21/15* (2006.01)

(52) U.S. Cl.
CPC .............. *B62D 25/18* (2013.01); *B62D 21/15* (2013.01)

(58) Field of Classification Search
CPC ...... B62D 25/161; B62D 25/18; B62D 25/16; B62D 25/163; B62D 25/165
See application file for complete search history.

(56) References Cited

U.S. PATENT DOCUMENTS

| | | | | |
|---|---|---|---|---|
| 6,296,298 | B1 * | 10/2001 | Barz .................... | B62D 29/002 296/187.02 |
| 6,866,115 | B2 * | 3/2005 | Miyasaka ............ | B62D 21/152 180/311 |
| 8,215,706 | B2 * | 7/2012 | Ohta ...................... | B60J 5/0431 296/187.12 |
| 8,469,442 | B1 * | 6/2013 | Pencak .................. | B62D 25/16 296/198 |
| 9,187,133 | B2 * | 11/2015 | Rangaswamaiah .... | B62D 21/15 |
| 9,233,715 | B1 * | 1/2016 | Ramoutar ............ | B62D 21/152 |
| 9,296,427 | B1 * | 3/2016 | Kim ...................... | B62D 25/082 |
| 9,340,230 | B2 * | 5/2016 | Murray .................. | B60R 19/00 |

(Continued)

FOREIGN PATENT DOCUMENTS

| | | | | |
|---|---|---|---|---|
| CN | 112074451 A | * | 12/2020 | ............. B62D 21/15 |
| WO | WO-2018220305 A1 | * | 12/2018 | ............. B62D 25/16 |

*Primary Examiner* — Emma K Frick
(74) *Attorney, Agent, or Firm* — Snell & Wilmer LLP

(57) ABSTRACT

Apparatuses, systems, and methods for accommodating relative movement between a vehicle body and a vehicle frame. An apparatus includes a flexible member attaching a tire catcher cover to a fender liner. The flexible member surrounds a perimeter of the tire catcher cover. The flexible member can seal a gap between the tire catcher cover and the fender liner. The flexible member can temporarily deform in response to relative movement between the vehicle frame and the vehicle body. The tire catcher cover can be mounted to a tire catcher and may move together with the tire catcher and the vehicle frame with respect to the fender liner. The fender liner can be mounted to a vehicle fender and may move together with the fender and the vehicle body with respect to the vehicle frame.

20 Claims, 5 Drawing Sheets

(56) References Cited

U.S. PATENT DOCUMENTS

| | | | | |
|---|---|---|---|---|
| 9,365,245 | B2 * | 6/2016 | Donabedian | B62D 25/04 |
| 9,517,741 | B2 * | 12/2016 | Watterworth | B62D 25/04 |
| 9,533,712 | B2 * | 1/2017 | Panganiban | B62D 25/025 |
| 9,669,784 | B2 * | 6/2017 | Jensen | B62D 21/152 |
| 9,688,311 | B2 * | 6/2017 | Yamamoto | B62D 25/025 |
| 9,694,853 | B2 * | 7/2017 | Craig | B62D 21/15 |
| 10,077,014 | B1 * | 9/2018 | Chiang | B62D 25/082 |
| 10,150,509 | B2 * | 12/2018 | McConnell | B62D 21/155 |
| 10,315,700 | B2 * | 6/2019 | Coppuck | B60G 3/20 |
| 10,358,175 | B2 * | 7/2019 | Shibutake | B62D 35/005 |
| 10,407,100 | B2 * | 9/2019 | Onoda | B62D 21/152 |
| 10,689,037 | B2 * | 6/2020 | Uehata | B62D 25/2036 |
| 10,822,027 | B2 * | 11/2020 | Karlsson | B62D 7/18 |
| 10,882,564 | B2 * | 1/2021 | Dennis | B62D 25/163 |
| 10,926,806 | B2 * | 2/2021 | Alwan | B62D 25/08 |
| 11,285,860 | B2 * | 3/2022 | Beilman | B60R 9/00 |
| 11,286,006 | B2 * | 3/2022 | Nishino | B62D 25/18 |
| 11,292,529 | B2 * | 4/2022 | Migaki | B62D 25/165 |
| 11,377,156 | B2 * | 7/2022 | Esber | B62D 25/18 |
| 11,504,924 | B2 * | 11/2022 | Marchlewski | B29C 45/14786 |
| 11,827,167 | B2 * | 11/2023 | Shah | B62D 21/152 |
| 11,851,104 | B2 * | 12/2023 | Shah | B62D 21/15 |
| 2019/0077349 | A1 * | 3/2019 | Saito | B62D 25/025 |
| 2024/0270315 | A1 * | 8/2024 | Darin | B62D 21/152 |
| 2025/0033707 | A1 * | 1/2025 | Benson | B62D 25/18 |

* cited by examiner

TIRE CATCHER COVER

300

MOVE A VEHICLE BODY WITH RESPECT TO A VEHICLE FRAME — 302

TRANSFER A LOAD FROM THE VEHICLE FRAME TO THE VEHICLE BODY — 304

DEFORM THE FLEXIBLE MEMBER WITH THE LOAD — 306

APPARATUS, SYSTEM, AND METHOD FOR TIRE CATCHERS FOR FRAME BASED VEHICLE

FIELD

The present disclosure relates to apparatuses, systems, and methods for tire catchers for frame based vehicles.

DESCRIPTION OF THE RELATED ART

Modern vehicles are designed with crash safety in mind. To avoid large deformations to the occupant area it is advantageous to control loading from a wheel or a tire. In this regard, various vehicles include tire catchers to protect a passenger compartment from a detached vehicle wheel from moving toward the passenger compartment when a collision force is applied to the vehicle. Frame based vehicles include a frame and a body. The vehicle frame and the body may move independently of each other during various conditions, for example when driving over rough roads or terrains.

Hence, there is a need for apparatuses, systems, and methods for mounting a tire catcher device to a frame based vehicle in a manner that can accommodate relative movement between the frame and the body without damaging the frame, the body, or the tire catcher device.

SUMMARY

Described herein is an apparatus for a vehicle. The apparatus includes a fender liner configured to be coupled to a fender of the vehicle, a tire catcher cover configured to be mounted to, and at least partially cover, a tire catcher of the vehicle, and a flexible member extending between and to the tire catcher cover and the fender liner.

Also described is a vehicle. The vehicle includes a vehicle frame, a vehicle body including a fender, a fender liner extending from the fender and at least partially defining a wheel well, a tire catcher mounted to the vehicle frame, a tire catcher cover mounted to, and at least partially covering, the tire catcher, and a flexible member coupled to the tire catcher cover and the fender liner.

Moreover, also described is a method for accommodating relative movement between a vehicle body and a vehicle frame. The method includes moving a vehicle body with respect to a vehicle frame, transferring a load from the vehicle frame to the vehicle body via a tire catcher, a tire catcher cover, and/or a flexible member, and deforming the flexible member with the load to accommodate the moving of the vehicle body with respect to the vehicle frame.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views, wherein:

DETAILED DESCRIPTION

The apparatuses, systems, and methods describe and provide for a tire catcher typically located at or in a wheel well of a vehicle for preventing or reducing foreign objects, including a damaged wheel/tire, from moving toward and/or entering a cabin vehicle. The apparatuses, the systems, and methods also accommodate for relative movement between a vehicle body and a vehicle frame. These apparatuses, systems, and methods provide many benefits and advantages including providing better coverage (i.e., by reducing or eliminating gaps in the fender liner), ease of installation, and reducing weight and increasing efficiency. The apparatuses, the systems, and the methods described herein may also reduce or eliminate corrosion. The apparatuses, the systems, and the methods described herein are easy to package and/or design due to the flexible material creating a single piece sub-assembly.

In an exemplary aspect, the apparatuses or systems include a tire catcher typically located at or in a wheel well of a vehicle and configured to prevent or reduce foreign objects, including a damaged wheel/tire, from moving toward and/or entering a cabin vehicle. A tire catcher apparatus includes a tire catcher mounted to a vehicle frame, a tire catcher cover mounted to the tire catcher, and a flexible member extending between and to the tire catcher cover and a fender liner. The tire catcher cover is mounted to the vehicle frame. The fender liner is mounted to the vehicle body. In various modes of operation of the vehicle (e.g., when driving over uneven terrain) the vehicle body may move with respect to the vehicle frame. For example, the vehicle body can sit on cab mounts on the frame, which allow for relative movement between the vehicle body and the vehicle frame. This relative movement between the body and the frame may damage the rigid tire catcher and/or the cover, and also the body and/or the frame. In this regard, the flexible member provides many benefits and advantages including accommodating relative movement of the tire catcher cover and the fender liner, while providing a seal or a gasket between these two parts, thereby preventing moisture, debris, and/or sound (i.e., acoustic waves) from passing therebetween. In some embodiments, the flexible member joins or attaches the tire catcher cover with or to the fender liner, enabling the two parts to be stored and installed as a single piece.

Figures 1, 2:
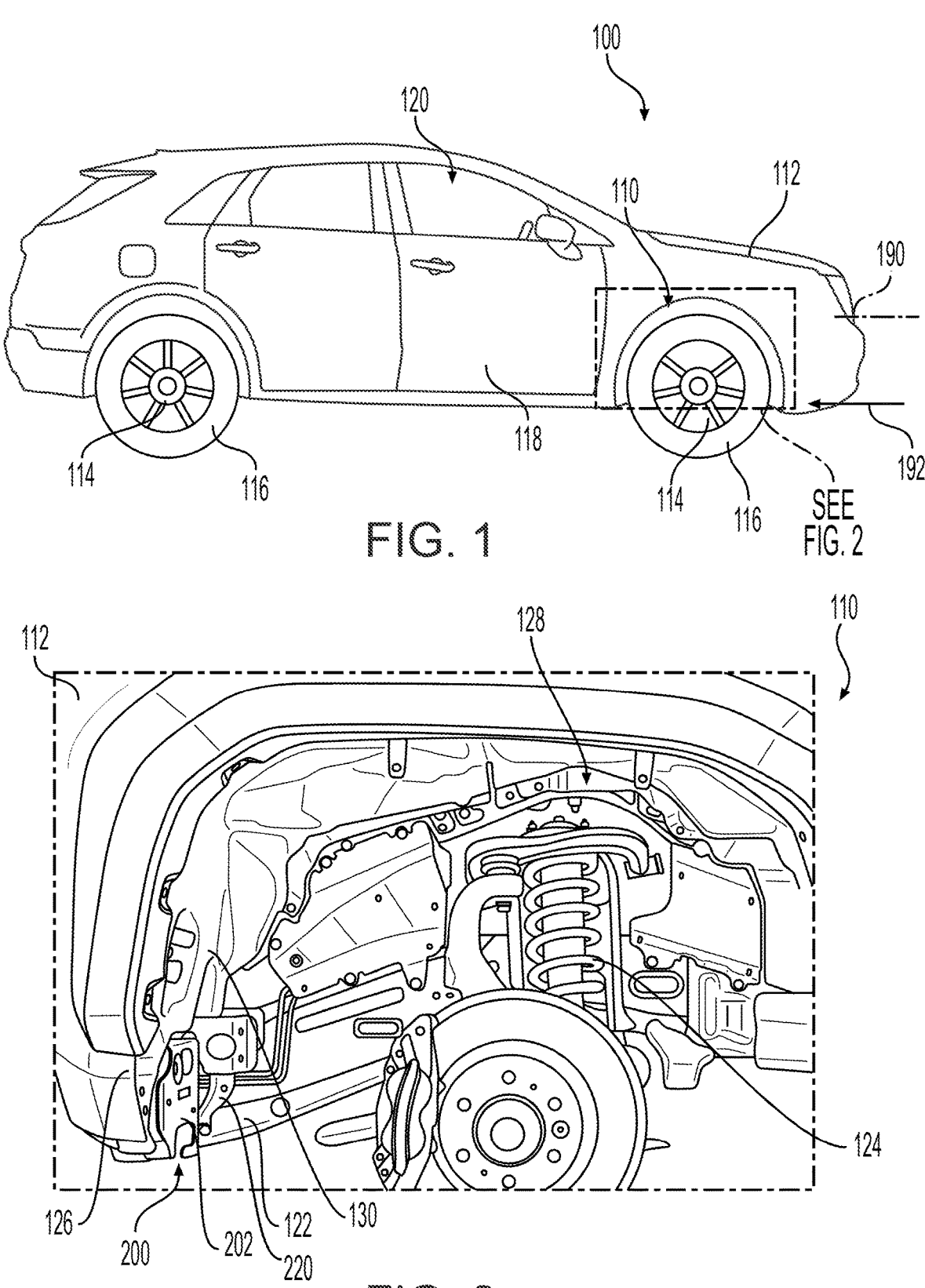
FIG. 1 is a schematic side view of a vehicle according to an embodiment of the present disclosure.
FIG. 2 is a schematic fragmentary, perspective view of a wheel well of the vehicle shown in FIG. 1 according to an embodiment of the present disclosure.
Figures 3, 4:
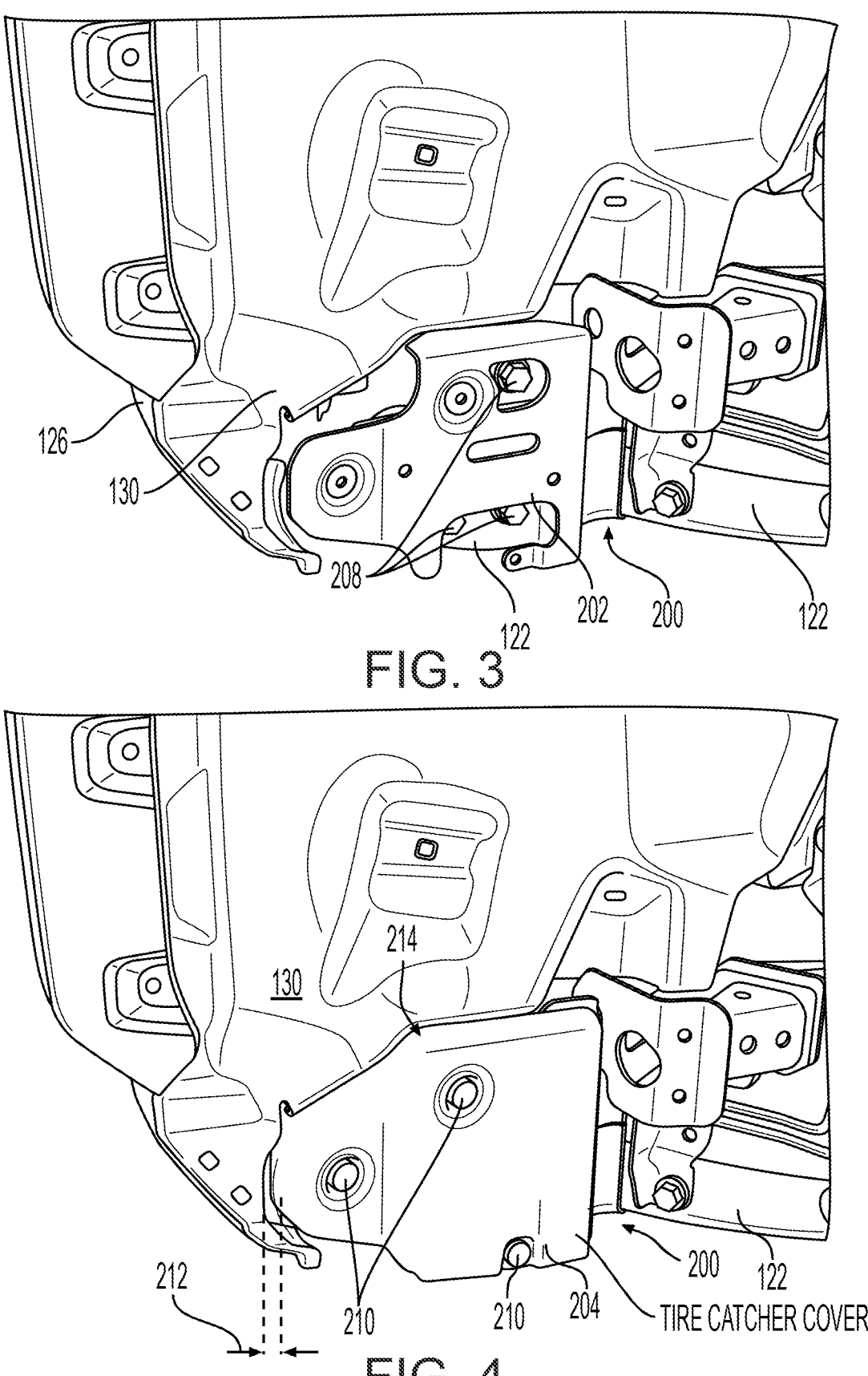
FIG. 3 is a schematic fragmentary, perspective view of a tire catcher installed at the wheel well of FIG. 2 according to an embodiment of the present disclosure.
FIG. 4 is a schematic fragmentary, perspective view of a tire catcher cover installed over the tire catcher of FIG. 3 according to an embodiment of the present disclosure.

Referring to the drawings, wherein like reference numbers correspond to like or similar components throughout the several figures. FIG. 1 generally shows a vehicle 100 including a vehicle body 112, which extends along a central longitudinal axis 190. The vehicle 100 may be a car, a truck, a van, or any other suitable automotive or non-automotive vehicle and includes a plurality of wheels 114 coupled to the vehicle body 112. Each wheel 114 is coupled to a tire 116. When the vehicle 100 is driven, the wheels 114 rotate relative to the vehicle body 112 in order to propel the vehicle 100.

With reference to FIG. 1, the vehicle 100 can further include at least one door 118 movably coupled to the vehicle body 112. The door 118 can move relative to the vehicle body 112 between a closed position and an open position. In the open position, the door 118 provides access to a passenger compartment 120 of the vehicle 100. The vehicle body 112 defines the passenger compartment 120, which is configured and sized to accommodate at least one driver and/or passenger.

With reference to FIG. 2, the vehicle 100 further includes a vehicle frame 122. The vehicle frame 122 may be part of the chassis of the vehicle 100. In this regard, the vehicle 100 can be a frame based vehicle (e.g., a body-on-frame vehicle). The vehicle body 112 is supported by the vehicle frame 122. For example, the vehicle body 112 can be mounted to the vehicle frame 122. The vehicle body 112 can sit on cab mounts (e.g., cab mount 220) on the vehicle frame 122, which allow for relative movement between the vehicle body 112 and the vehicle frame 122. The vehicle frame 122 may support various other vehicle components. The vehicle 100 can include one or more suspension components 124 (e.g., a coil spring, a leaf spring, a shock, a strut, etc.) coupled between the vehicle frame 122 and the wheels 114. The suspension components 124 can absorb energy transferred to the vehicle 100 from the wheels 114, for example when the vehicle 100 is traversing uneven or rough terrain.

The vehicle body 112 can include a fender 126 which extends around and partially defines a wheel well 128 at which or in which the wheel 114 and the tire 116 are located. The fender 126 can extend around a perimeter of the wheel well 128. The fender 126 can be made of a sheet of material (e.g., metal, hard plastic, fiber-reinforced composite, etc.) formed (e.g., stamped, molded, etc.) into a thin contoured panel having a curved edge at least partially defining the wheel well 128. A fender liner 130 can extend inward from the fender 126 and further define the wheel well 128. The fender liner 130 can extend inward from the curved edge of the wheel well 128. The fender liner 130 moves together with the remainder of the vehicle body 112. The fender liner 130 can be a metal liner. The fender liner 130 can be a composite liner, a hard plastic liner, or the like. The fender liner 130 can be made of a sheet of material and formed into a curved sheet or panel to define the wheel well 128. The fender liner 130 can be a curved device (e.g., a shaped sheet of material) that contours the wheel well 128. In embodiments, the fender liner 130 has an arcuate geometry. For example, the fender liner 130 can be sized and configured to accommodate a vehicle tire 116 within the wheel well 128. In various embodiments, the fender liner 130 extends between ninety degrees and two hundred degrees around a perimeter of the wheel 114 and/or the tire 116.

The vehicle 100 further includes a tire catcher apparatus 200 configured to prevent or hinder the movement of at least one of the wheel 114 and/or the tire 116 toward the passenger compartment 120 when an external, frontal offset force 192 is applied to the vehicle 100. The external frontal offset force 192 can be a force applied to the front of the vehicle 100, where the force is offset from the central longitudinal axis 190 defined along the vehicle body 112. The central longitudinal axis 190 extends along the vehicle body in the fore/aft direction. The external, frontal offset force 192 can be spaced or spaced apart from the central longitudinal axis 190 in a cross-vehicle (or lateral) direction. The cross-vehicle direction is perpendicular to the fore/aft direction. When the vehicle 100 is subjected to the external, frontal, offset force 192, the tire catcher apparatus 200 can prevent, or at least hinder one of the tires 116 (along with the corresponding wheel 114) from being displaced toward the passenger compartment 120. In the depicted embodiment, the vehicle 100 includes a tire catcher apparatus 200 attached or coupled to the vehicle frame 122 behind the wheels 114 (which in this case are the front wheels).

With reference to FIG. 2, FIG. 3, FIG. 4, and FIG. 5A, the tire catcher apparatus 200 includes a tire catcher 202, a tire catcher cover 204, and a flexible member 206. The tire catcher 202 can be formed as a metal plate. The tire catcher 202 can be mounted to the vehicle frame 122, for example using a first plurality of fasteners 208. In various embodiments, the tire catcher 202 can be coupled to the vehicle frame 122 using a metal joining process such as a welding process, a soldering process, and/or a brazing process. For example, the tire catcher 202 can be welded directly to the vehicle frame 122. In this regard, the tire catcher 202 can be fixed to the vehicle frame 122. The tire catcher 202 can be located aft of the tire 116 located in the corresponding wheel well and be sized to correspond to a width of the tire 116. For example, the tire catcher 202 can extend in a cross-vehicle direction a distance of between 25% and 125%, between 50% and 125%, or between 75% and 125% of a width of the tire 116, in accordance with various embodiments. The tire catcher cover 204 can be mounted to the tire catcher 202, for example using a second plurality of fasteners 210. In this regard, the tire catcher cover 204 can partially or completely cover and be fixed to the tire catcher 202. The tire catcher cover 204 can be disposed adjacent to the fender liner 130 such that the tire catcher cover 204 and the fender liner 130 both contour the wheel well 128. In this manner, both the tire catcher cover 204 and the fender liner 130 have surfaces that face, and are exposed to, a wheel (e.g., wheel 114) of the vehicle 100 when in the installed position.

The tire catcher 202 can be made of a first metal material (e.g., steel, aluminum, and alloys thereof, among others) and the tire catcher cover 204 can be made of at least one of a hard plastic material, a composite material, or a second metal material (e.g., steel, aluminum, and alloys thereof, among others). The tire catcher cover 204 protects the tire catcher 202 from foreign objects (e.g., rocks, liquids, or other debris being kicked up by the vehicle tire and thrown against the tire catcher cover 204). The tire catcher cover 204 is formed in the shape and size of the tire catcher 202 and configured to completely or substantially cover the side of the tire catcher 202 that is exposed to the wheel well 128. In this manner, the tire catcher cover 204 protects the tire catcher 202 from damage (e.g., chipping, denting, etc.) and/or corrosion (e.g., salt exposure).

A gap 212 may exist between the tire catcher cover 204 and the fender liner 130. The gap 212 can be sufficiently large that debris, moisture, and/or sound (i.e., acoustic waves) can pass between the tire catcher cover 204 and the fender liner 130. The gap 212 can be an elongated gap that extends from a first end (e.g., an outboard end) of the tire catcher cover 204 to a second end (e.g., an inboard end) of the tire catcher cover 204. The gap 212 can be curved to follow an interface or seam 214 (i.e., where the fender liner 130 and the tire catcher cover 204 meet) between the fender liner 130 and the tire catcher cover 204. The gap 212 can be generally uniform (though not perfectly uniform in various embodiments) as the fender liner 130 can be configured to contour the tire catcher cover 204 along the seam 214. Stated differently, the fender liner 130 can be shaped to follow a contour of the tire catcher cover 204 at the seam 214. In some embodiments, the gap 212 extends along the entire seam 214 between the fender liner 130 and the tire catcher cover 204. In this regard, it may be desirable to seal the gap 212 to attach the tire catcher cover 204 to the fender liner 130 and/or to block debris, moisture, and/or sound (i.e., acoustic waves) from entering the gap 212. For example, manufacturing the tire catcher cover 204 and the fender liner 130 as a single piece sub-assembly can increase ease of installation of the fender liner 130/tire catcher cover 204 sub-assembly to the vehicle 100. Moreover, it may be desirable to couple the tire catcher cover 204 to the fender liner 130 in a manner that accommodates relative movement between the tire catcher cover 204 and the fender liner 130.

In this regard, the flexible member 206 is provided to couple the tire catcher cover 204 to the fender liner 130. The flexible member 206 can extend along the seam 214. In this regard, the flexible member 206 can be an elongated piece of soft, flexible material spanning the seam 214. For example, the flexible member 206 can extend along or span the width of the seam 214 (i.e., the shortest distance between the tire catcher cover 204 to the fender liner 130) and also extend along or span the length of the seam 214. The flexible member 206 can be made of a flexible material, such as an elastomer material or a soft plastic material, configured to flex in response to relative movement between the tire catcher cover 204 and the fender liner 130 in a manner that does not damage the flexible member 206, the tire catcher cover 204, and/or the fender liner 130. In various embodiments, the flexible member 206 can be made of a silicone or rubber-based epoxy. Forming the flexible member 206 of a flexible material as described herein advantageously allows the flexible member 206 to deform to accommodate the relative movement and withstand numerous cycles of movement without damage to the flexible member 206, the tire catcher cover 204, and/or the fender liner 130.

The fender liner 130 can be a made of a third material different from that of the flexible member 206. For example, the fender liner 130 may be more rigid than the flexible member 206. In various embodiments, the flexible member 206 can be formed as a gasket. The flexible member 206 is disposed along the seam 214 between the tire catcher cover 204 and the fender liner 130 and/or in the gap 212 between the tire catcher cover 204 and the fender liner 130. The flexible member 206 may join or attach the tire catcher cover 204 to the fender liner 130, thereby enabling the two parts to be stored and installed as a single piece. The flexible member 206 may also accommodate some relative movement between the tire catcher cover 204 and the fender liner 130 while sealing the gap 212 between the tire catcher cover 204 and the fender liner 130, thereby preventing moisture, debris, and/or sound (i.e., acoustic waves) from passing therebetween.

Figure 5A:
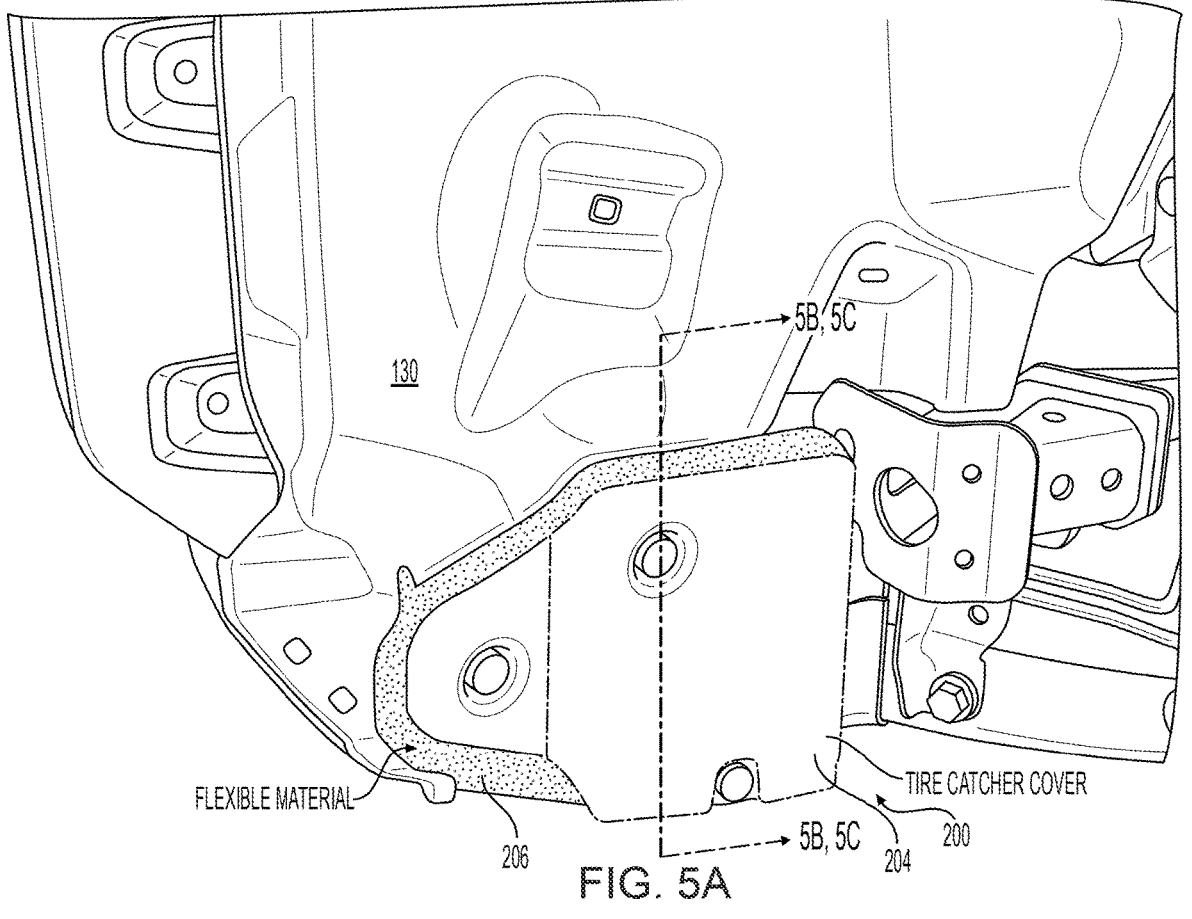
FIG. 5A is a schematic fragmentary, perspective view of a flexible member installed between the tire catcher cover and the fender liner of FIG. 4 according to an embodiment of the present disclosure.
Figure 5B:
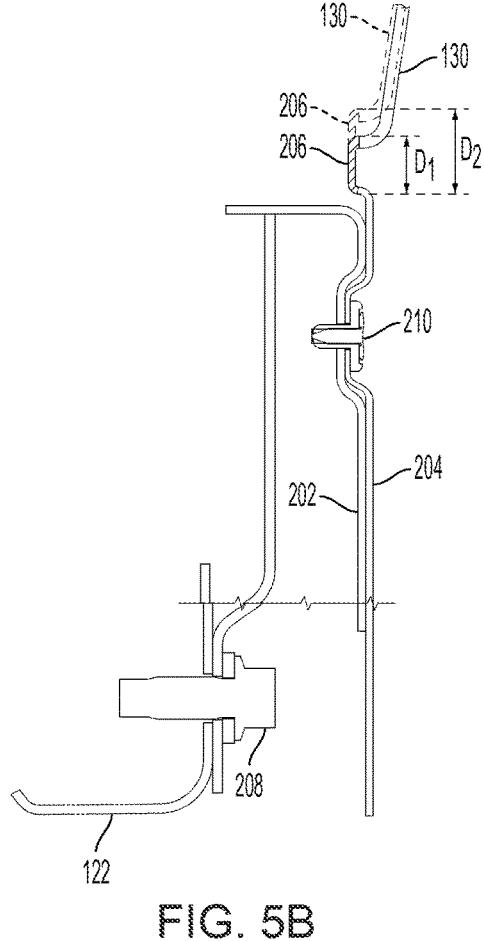
FIG. 5B is a section view of the tire catcher apparatus of FIG. 5A with the fender liner in first and second positions relative to the tire catcher cover according to an embodiment of the present disclosure.

With reference to FIG. 5B, the flexible member 206 extends between the fender liner 130 and the tire catcher cover 204 in accordance with an embodiment of the present disclosure. In various embodiments, the flexible member 206 extends linearly between and to the fender liner 130 and the tire catcher cover 204. In this regard, a total length of the flexible member 206 can be approximately equal to a distance between the fender liner 130 and the tire catcher cover 204. A first end of the flexible member 206 can be coupled to the fender liner 130 and a second end of the flexible member 206 can be coupled to the tire catcher cover 204. In response to the fender liner 130 moving from a first position (shown in solid lines in FIG. 5B) to a second position (shown in dashed lines in FIG. 5B), the fender liner 130 can move away from the tire catcher cover 204, thereby causing the flexible member 206 to stretch from a first dimension D1 to a second dimension D2. The fender liner 130 can also move toward the tire catcher cover 204, thereby causing the flexible member 206 to compress. The first dimension D1 can be a linear dimension from the first end of the flexible member 206 to the second end of the flexible member 206. The second dimension D2 can be a linear dimension from the first end of the flexible member 206 to the second end of the flexible member 206. The first dimension D1 is less than the second dimension D2. The second dimension D2 can be between one and two times the first dimension D1 (e.g., $D1<D2<2*D1$). The second dimension D2 can be between one and three times the first dimension D1 (e.g., $D1<D2<3*D1$). The second dimension D2 can be between one and one and one half times the first dimension D1 (e.g., $D1<D2<(3/2)*D1$). Accordingly, the flexible member 206 can be a flexible elastomer or soft plastic material configured to stretch to accommodate movement between the fender liner 130 and the tire catcher cover 204.

Figure 5C:
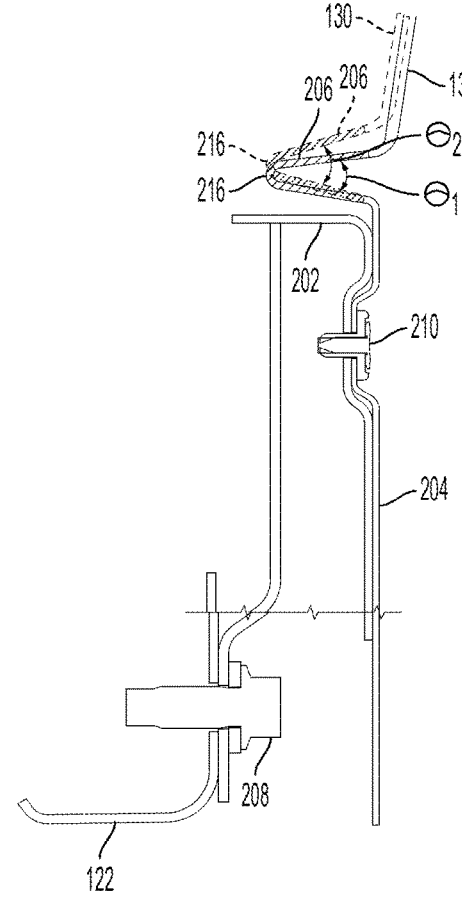
FIG. 5C is a section view of the tire catcher apparatus of FIG. 5A with the fender liner in first and second positions relative to the tire catcher cover according to an embodiment of the present disclosure.

With reference to FIG. 5C, the flexible member 206 extends between the fender liner 130 and the tire catcher cover 204 in accordance with an embodiment of the present disclosure. In various embodiments, the flexible member 206 extends between and to the fender liner 130 and the tire catcher cover 204 along a curved path. In this regard, a total length of the flexible member 206 can be greater than a distance between the fender liner 130 and the tire catcher cover 204. For example, the total length of the flexible member 206 can be between two and eight times the distance between the fender liner 130 and the tire catcher cover 204; though in various embodiments the length of the flexible member 206 can be less than two times this distance or greater than eight times this distance. A first end of the flexible member 206 can be coupled to the fender liner 130 and a second end of the flexible member 206 can be coupled to the tire catcher cover 204. A bend 216 can be located in the flexible member 206 between the first end and the second end thereof. The bend 216 can form a concave surface facing the wheel well (e.g., wheel well 128) and a convex surface facing away from the wheel well. In various embodiments, the bend 216 can be at a midpoint of the flexible member 206. In various embodiments, the flexible member 206 can have an accordion shape with a plurality of bends 216. In response to the fender liner 130 moving from a first position (shown in solid lines in FIG. 5B) to a second position (shown in dashed lines in FIG. 5B), the fender liner 130 can move away from the tire catcher cover 204, thereby causing the flexible member 206 to flex and/or bend from a first angle $\theta_1$ to a second angle $\theta_2$. The first angle $\theta_1$ can be less than the second angle $\theta_2$. It should be understood that the fender liner 130 can move toward the tire catcher cover 204, thereby causing the flexible member 206 to flex and/or bend from the second angle $\theta_2$ to the first angle $\theta_1$. The second angle $\theta_2$ can be between one degree and forty-five degrees of the first angle $\theta_1$. The second angle $\theta_2$ can be between five degrees and thirty degrees of the first angle $\theta_1$. The variance between the first angle $\theta_1$ and the second angle $\theta_2$ can be selected depending on various factors including the number of bends 216, the total length of flexible member 206, the material used for flexible member 206 (e.g., the flexibility of flexible member 206), and the expected change in distance between the fender liner 130 and the tire catcher cover 204. Accordingly, the flexible member 206 can be a flexible elastomer or a soft, flexible plastic material configured to bend and/or flex to accommodate movement between the fender liner 130 and the tire catcher cover 204.

In various embodiments, the flexible member 206 can be attached to the fender liner 130 and/or the tire catcher cover 204 by co-injection or overmolding. In various embodiments, the flexible member 206 can be fused to the fender liner 130 and/or the tire catcher cover 204 by heat and/or sonic welding. In various embodiments, the flexible member 206 can be mechanically coupled to the fender liner 130 and/or the tire catcher cover 204 with fasteners (e.g., screws, bolts, retainer clips, etc).

Figure 6:
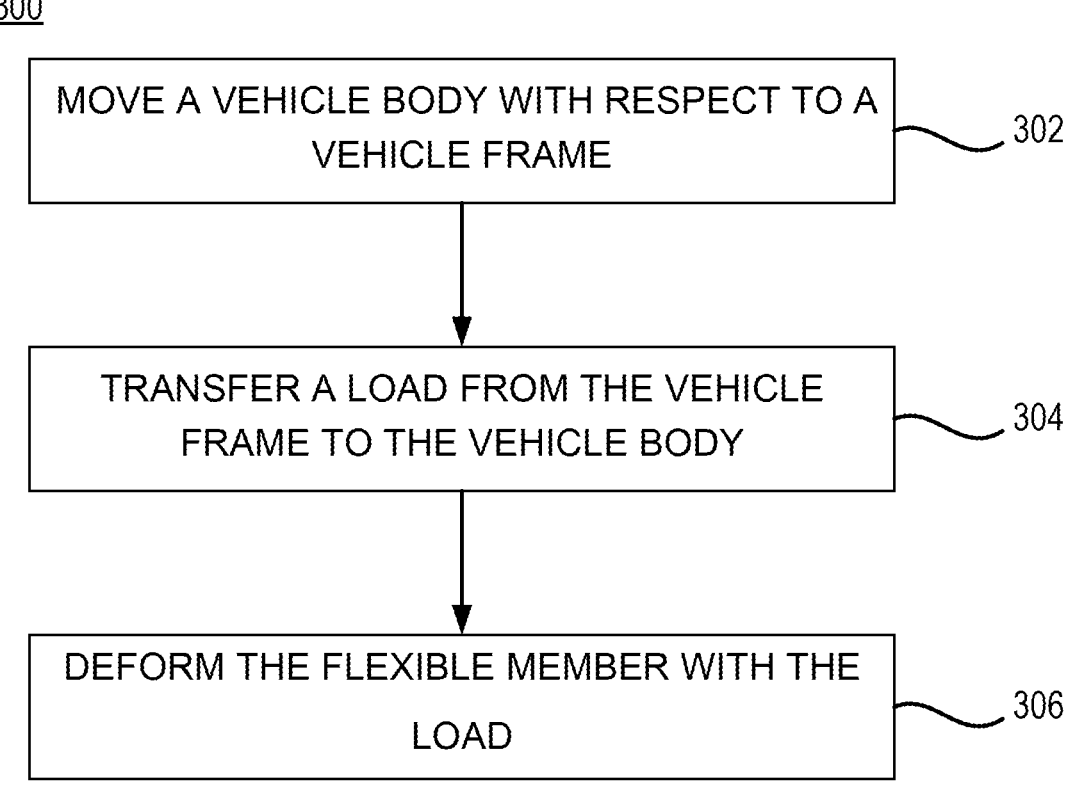
FIG. 6 is a flowchart illustrating a method for accommodating movement between a vehicle frame and a vehicle body according to an embodiment of the present disclosure.

With reference to FIG. 6, a flowchart illustrating a method 300. In various embodiments, the method 300 is a method for accommodating relative movement between a vehicle body and a vehicle frame.

In step 302, the method 300 includes moving a vehicle body with respect to a vehicle frame. As described herein, the vehicle body can be moved with respect to the vehicle frame in response to a vehicle driving over an uneven surface or in response to an external load being applied to the vehicle.

In step 304, the method 300 includes transferring a load from the vehicle frame to the vehicle body via a tire catcher, a tire catcher cover, and/or a flexible member. As described herein, in response to the vehicle frame (e.g., vehicle frame 122) moving with respect to the vehicle body (e.g., vehicle body 112), the tire catcher (e.g., tire catcher 202) and the tire catcher cover (e.g., tire catcher cover 204) may move together with the vehicle frame with respect to a fender liner (e.g., fender liner 130). Stated differently, the tire catcher cover may move with respect to the fender liner. The flexible member extends between and to the fender liner and the tire catcher cover. In this regard, the flexible member can be configured to deform to accommodate movement of the vehicle body with respect to the vehicle frame and thereby prevent damage to the vehicle body, the fender liner, the tire catcher cover, the tire catcher, and/or the vehicle frame. In this regard, in step 306, the method 300 includes deforming the flexible member with the load. For example, the flexible member can stretch or compress as described with respect to FIG. 5B and/or the flexible member can bend as described with respect to FIG. 5C. The flexible member can be configured to temporarily deform and return to its original state (i.e., the flexible member can elastically deform without plastic deformation). In various embodiments, the flexible member can be configured to plastically deform and/or break at a load which is less than a maximum load rating of the fender liner and/or the tire catcher cover. Stated differently, the flexible member can be configured to break before the tire catcher cover or the fender liner would otherwise break if the flexible member had not already broken, thereby removing the load path between these two parts.

Where used throughout the specification and the claims, "at least one of A or B" includes "A" only, "B" only, or "A and B." Exemplary embodiments of the apparatuses, the systems, and the methods described herein have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. An apparatus for a frame-based vehicle including a vehicle frame and a vehicle body mounted to the vehicle frame, and the vehicle frame is part of a chassis of the vehicle, the apparatus comprising:

a fender liner configured to be coupled to a fender of the vehicle, the fender liner comprising a curved sheet of material so as to contour a wheel well;

a tire catcher cover configured to be mounted to, and at least partially cover, a tire catcher of the vehicle, the tire catcher configured to prevent or hinder a movement of at least one of a wheel and/or a tire toward a passenger compartment when an external, frontal offset force is applied to the vehicle; and a flexible member extending between and to the tire catcher cover and the fender liner, the flexible member extending along a seam between the tire catcher cover and the fender liner, the flexible member is configured to deform to accommodate relative movement between the vehicle body and the vehicle frame.

2. The apparatus of claim 1, wherein the flexible member is configured to accommodate relative movement between the tire catcher cover and the fender liner; and the flexible member is configured to at least one of stretch, compress, or bend in response to the tire catcher cover moving with respect to the fender liner.

3. The apparatus of claim 2, wherein the flexible member is configured to seal a gap between the tire catcher cover and the fender liner so as to stop at least one of a moisture, a debris, or an acoustic wave from passing therebetween, the gap extends along the seam between the tire catcher cover and the fender liner.

4. The apparatus of claim 3, wherein the flexible member is made of a material that is different from that of the tire catcher cover and that of the fender liner, and the flexible member is made of at least one of an elastomer material or a first plastic material.

5. The apparatus of claim 4, wherein the flexible member has a bend disposed between a first end and a second end thereof.

6. The apparatus of claim 4, wherein the tire catcher is configured to be mounted to the vehicle frame.

7. The apparatus of claim 6, wherein the tire catcher is made of a first metal material and the tire catcher cover is made of at least one of a second plastic material, a composite material, or a second metal material.

8. The apparatus of claim 7, wherein the tire catcher cover is configured to be secured to the tire catcher with a first plurality of fasteners.

9. The apparatus of claim 8, wherein the tire catcher is configured to be secured to the vehicle frame with at least one of a second plurality of fasteners or a weld.

10. A vehicle comprising:

a vehicle frame forming part of a chassis of the vehicle;

a vehicle body positioned on the vehicle frame and including a fender;

a fender liner extending from the fender and at least partially defining a wheel well;

a tire catcher mounted to the vehicle frame at the wheel well, the tire catcher configured to prevent or hinder a movement of at least one of a wheel and/or a tire toward a passenger compartment when an external, frontal offset force is applied to the vehicle;

a tire catcher cover mounted to, and at least partially covering, the tire catcher; and a flexible member coupled to the fender liner and the tire catcher cover and extending along a seam between the fender liner and the tire catcher cover, and the flexible member is configured to deform to accommodate relative movement between the vehicle frame and the vehicle body.

11. The vehicle of claim 10, wherein the flexible member is configured to accommodate relative movement between the tire catcher cover and the fender liner while the vehicle is driving;

the flexible member extends between and to the tire catcher cover and the fender liner; and the flexible member is configured to at least one of stretch, compress, or bend in response to the tire catcher cover moving with respect to the fender liner.

12. The vehicle of claim 11, wherein the vehicle body sits on a cab mount located on the vehicle frame, and the cab mount allows for the relative movement between the vehicle body and the vehicle frame.

13. The vehicle of claim 11, wherein the flexible member comprises a first material, the tire catcher cover comprises a second material different from the first material, and the fender liner comprises a third material different from the first material.

14. The vehicle of claim 13, wherein the flexible member is configured to seal a gap between the tire catcher cover and the fender liner so as to stop at least one of a moisture, a debris, or an acoustic wave from passing therebetween.

15. The vehicle of claim 13, wherein the flexible member is made of at least one of an elastomer material or a plastic material.

16. The vehicle of claim 15, wherein the tire catcher is made of a first metal material and the tire catcher cover is made of at least one of a plastic material, a composite material, or a second metal material.

17. The vehicle of claim 10, wherein the tire catcher cover is disposed adjacent to the fender liner such that the tire catcher cover and the fender liner both contour the wheel well and have major surfaces that face the at least one of the wheel and/or the tire when installed, and wherein a gap is present between the tire catcher cover and the fender liner and the flexible member is disposed along the seam and at least partially within the gap.

18. The vehicle of claim 10, wherein the tire catcher cover substantially covers a side of the tire catcher that is exposed to the wheel well and is disposed between the tire catcher and the at least one of the wheel and/or the tire so as to protect the tire catcher from foreign objects being kicked up by the at least one of the wheel and/or the tire while the vehicle is driving.

19. The vehicle of claim 10, wherein a shape and a size of the tire catcher cover is complementary to that of the tire catcher so as to cover a side of the tire catcher that is exposed to the wheel well.

20. The vehicle of claim 10, wherein the tire catcher extends in a cross-vehicle direction a distance of between 25% and 125% of a width of the tire.

* * * * *